UNITED STATES PATENT OFFICE.

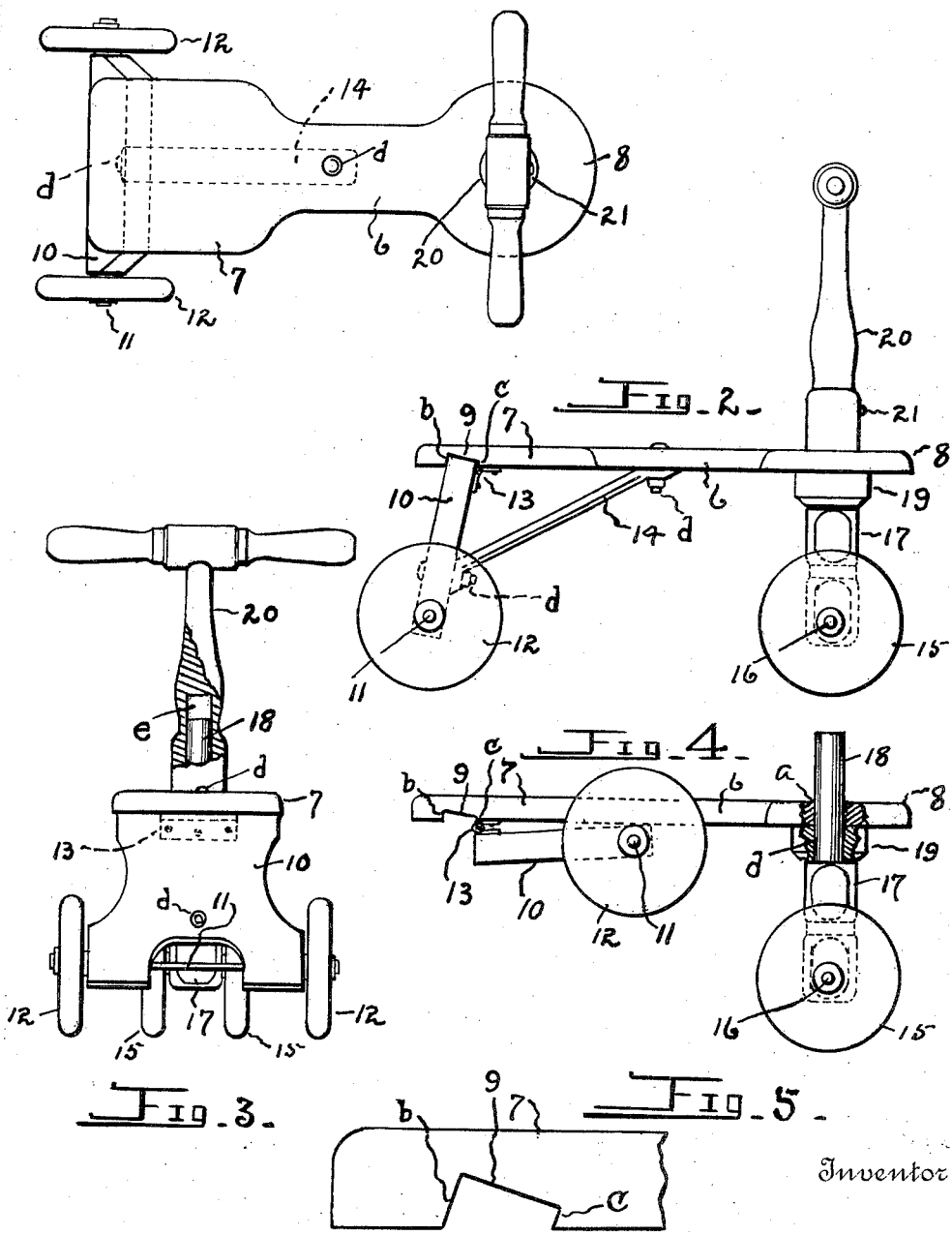

CHARLES F. ISRAEL, OF OMAHA, NEBRASKA.

CHILD'S WHEEL-COASTER.

1,364,280. Specification of Letters Patent. Patented Jan. 4, 1921.

Application filed March 15, 1920. Serial No. 366,075.

*To all whom it may concern:*

Be it known that I, CHARLES F. ISRAEL, citizen of the United States, residing at Omaha, in the county of Douglas and State of Nebraska, have invented certain new and useful improvements in Children's Wheel-Coasters, of which the following is a specification.

This invention relates to an improvement in wheel-coasters for children, and has for its object to provide a riding vehicle of the class adapted to be propelled by the rider or for coasting down inclines, the construction to be such that durability may be attained, and that the seat and weight of the rider will be disposed at such a distance forwardly of the rear wheels that overturning will not likely occur. The invention includes a novel mounting for one of the bolsters and rear wheels, whereby stresses will be sustained to advantage, and to collapsible features which operate as a convenience in packing and tending to materially reducing the cost of shipping from the factory and reducing the ultimate retail price of the wheel coasters.

The invention consists of the novel construction, combination and arrangement of parts as described herein and claimed, and as illustrated in the accompanying drawing, wherein,—

Figure 1 is a plan view of the coaster. Fig. 2 is a view of the same in side elevation. Fig. 3 is a rear end view, partly in section, of the coaster. Fig. 4 is a side view partly broken and in section, showing the coaster when partly collapsed. Fig. 5 is a broken away view partly in section, showing the channel provided for the platform, the view being on an enlarged scale.

Referring now to the drawing, the wheel-coaster consists of a rectilinear platform having a comparatively narrow part 6 between its seat 7 and front end, said front end 8 having a width corresponding approximately to the width of the seat, and being substantially of disk-form, and provided at its middle with an aperture $a$, this construction for the front end being of advantage for adequately resisting stresses directed thereto by the pintle 18 and steering-post 20, said platform, perferably, being constructed of wood, and requiring the reinforcement mentioned.

At 9 is indicated a channel formed transversely in the seat to open upon its lower side, the side walls of the channel, indicated at $b$ and $c$ being approximately parallel.

At 10 is indicated a bolster-plate, its lower part being somewhat longer than the width of the platform, said plate being suitably apertured for receiving the axle-rod 11 upon which the rear wheels 12 are mounted, the upper part of the bolster-plate having parallel sides and a thickness corresponding approximately to the width of the channel 9 of the platform.

The bolster-plate is connected with the platform by means of a hinge 13 which is secured by conventional means to the platform and to the inner side of said plate, whereby said bolster-plate may have swinging movements to be disposed with its upper side engaging in the channel 9, or to the position shown in Fig. 4, to lie approximately parallel with and closely adjacent to the platform, a part of the wheels 12 being in a plane above said platform, and when disposed in its normal position shown in Fig. 2, it may be maintained in stationary relation with the platform by means of a brace 14, said brace being disposed in inclined relation to the platform and bolster-plate and being removably secured to these parts by bolts $d$ or equivalent keepers.

As plainly shown in Fig. 5, the side walls $b$ and $c$ for the channel 9 are disposed at an oblique angle to the longitudinal axis of the platform, and therefore the bolster-plate will be disposed downwardly and rearwardly divergent from the platform to the axle-rod 11, the upper part of said plate being adapted to approximately fill the channel when the brace 14 is applied.

The construction as described is of great advantage since it tends to prevent a rearward overturning of the vehicle, the plate 10 being disposed inclinedly and the wheels being disposed rearwardly of the seat. Also the channel 9 operates as a socket for receiving the bolster-plate, and forwardly or rearwardly directed stresses will be adequately sustained by the brace 14, the hinge 13 operating to maintain the bolster-plate within the channel. Also it will be seen that the stresses directed to the hinge will be very slight, the weight upon the seat being supported by the bolster-plate and wheels; another advantage being that the braces 14 may be readily applied after the delivery of the vehicles to the retailer or individual purchaser, and when shipped from the factory the bolster-plate together with the rear wheels may be swung to the position shown in Fig. 4, which facilitates packing the vehicles within a limited space, and thereby limiting freight charges.

After delivery from the factory, the brace 14 may be readily secured to the platform and to the bolster-plate, suitable apertures being provided in which the bolts may be inserted.

The front wheels 15 are preferably disposed near each other and are axially mounted, as indicated at 16, upon the opposed sides of a bolster-block 17, said block being provided with a pintle 18 adapted to be inserted within or removed from the aperture $a$ of the platform and aperture $d$ of a spacing-block 19 which is provided for the lower part of the platform, a spindle or steering-post 20 having a recess $e$ being provided, said recess being adapted to receive the pintle 18 and to be secured thereon by means of a screw or equivalent keeper 21; and since the pintle and steering-post may be removed, the parts may be packed within a very limited space when shipped from the factory to effect a saving in costs, as above mentioned.

What I claim as my invention and desire to secure by Letters Patent is,—

1. A wheel coaster comprising a platform, a bolster-block below and having a pintle removably engaging the platform near the front end thereof, wheels on the bolster-block, a steering-post removably mounted on the pintle, said platform having a channel formed transversely therein near its rear end to open on its lower side, the side walls of said channel in cross-section being disposed at an oblique angle to the longitudinal axis of said platform, a bolster-plate engaging in the channel to extend downwardly and rearwardly of the platform, wheels on the bolster-plate, a brace-bar having a removable connection with the platform and bolster-plate, and a hinge-member connecting the platform with the bolster-plate to permit the latter to be swung upwardly to lie adjacent to the platform after the brace-bar has been disconnected from said bolster-plate and platform.

2. In a wheel coaster, the combination with a platform provided at its front end with wheels and a steering-post, said platform being provided transversely, in its lower side with a channel having its side walls disposed at an oblique angle to its longitudinal axis, a bolster-plate provided with wheels, a hinge connected with the platform and bolster-plate to cause the top of said plate to enter said channel when said plate is swung rearwardly, and a brace-member adapted to have its respective ends removably mounted upon the platform and said bolster-plate.

In testimony whereof I have affixed my signature in presence of two witnesses.

CHAS. F. ISRAEL.

Witnesses:
 HIRAM A. STURGES,
 ARTHUR H. STURGES.